United States Patent [19]
Doyle

[11] Patent Number: 5,400,897
[45] Date of Patent: Mar. 28, 1995

[54] FERTILIZER CONVEYOR

[75] Inventor: Monty M. Doyle, Quincy, Ill.

[73] Assignee: Doyle Equipment Manufacturing Company, Quincy, Ill.

[21] Appl. No.: 214,801

[22] Filed: Mar. 16, 1994

[51] Int. Cl.⁶ .............................................. B65G 45/18
[52] U.S. Cl. .................. 198/496; 198/836.1; 198/860.5
[58] Field of Search .................. 198/496, 860.3, 860.5, 198/836.1, 816

[56] References Cited

U.S. PATENT DOCUMENTS

| 2,760,622 | 8/1956 | Magee | 198/860.5 X |
| 2,890,803 | 6/1959 | Vanier et al. | 198/496 X |
| 3,212,631 | 10/1965 | Thompson | 198/496 |
| 3,292,773 | 12/1966 | Keehart et al. | 198/860.5 X |
| 3,957,155 | 5/1976 | Enchelmaier | 198/496 |
| 4,819,790 | 4/1989 | Adcock | 198/836.1 X |
| 4,874,082 | 10/1989 | Swinderman | 198/836.1 |
| 5,109,976 | 5/1992 | Mohri et al. | 198/498 |
| 5,129,508 | 7/1992 | Shelstad | 198/860.3 |
| 5,156,260 | 10/1992 | Dorner et al. | 198/836.1 X |

FOREIGN PATENT DOCUMENTS 1093283  6/1967  United Kingdom ............... 198/496

Primary Examiner—James R. Bidwell
Attorney, Agent, or Firm—Kalish & Gilster

[57] ABSTRACT

A conveyor for transferring loose bulk material, such as fertilizer and the like, in a manner which minimizes the creation of airborne dust includes structure for movably supporting the material to be transferred, structure for automatically cleaning the movable support during movement of material thereon and for causing the structure for movably supporting the material to be transferred to move.

23 Claims, 5 Drawing Sheets

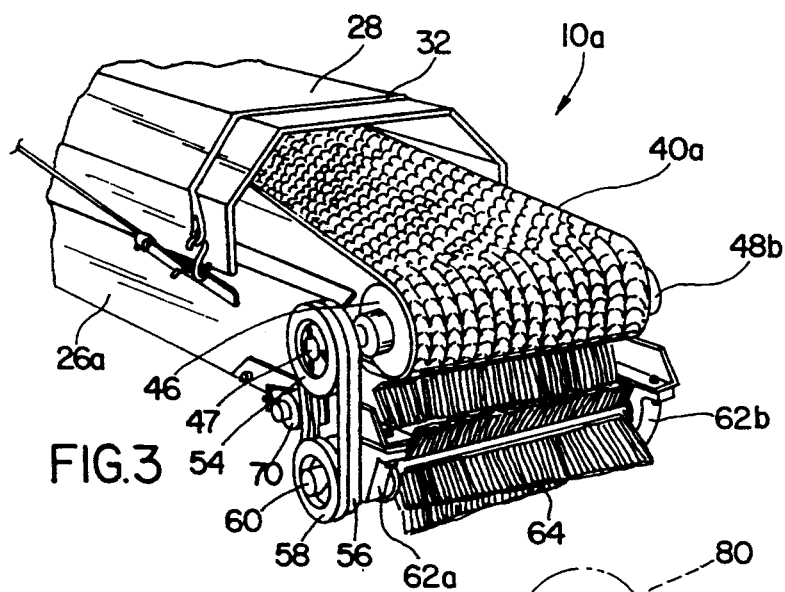
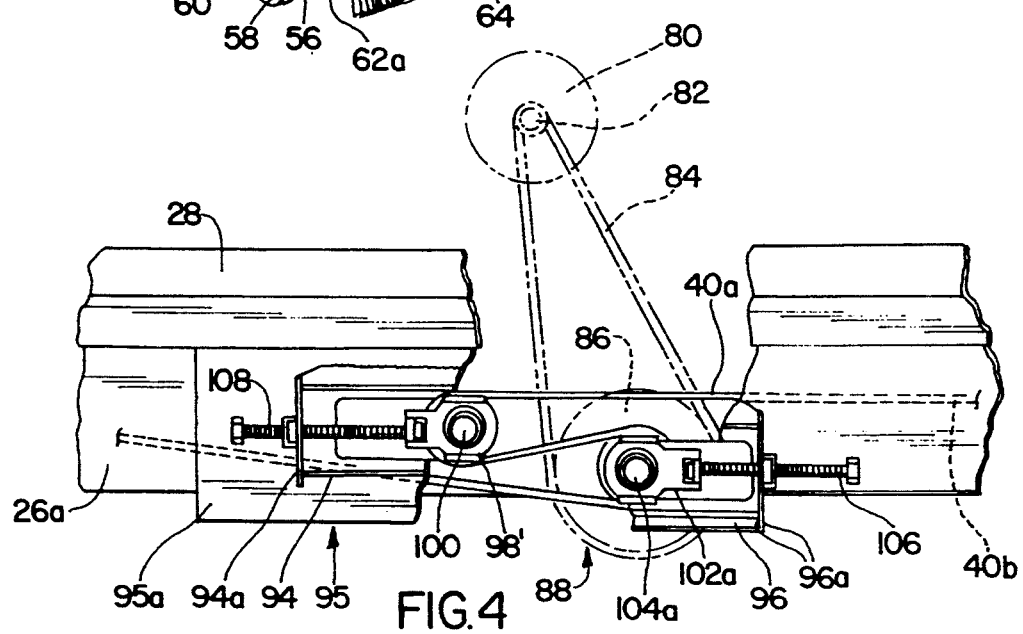
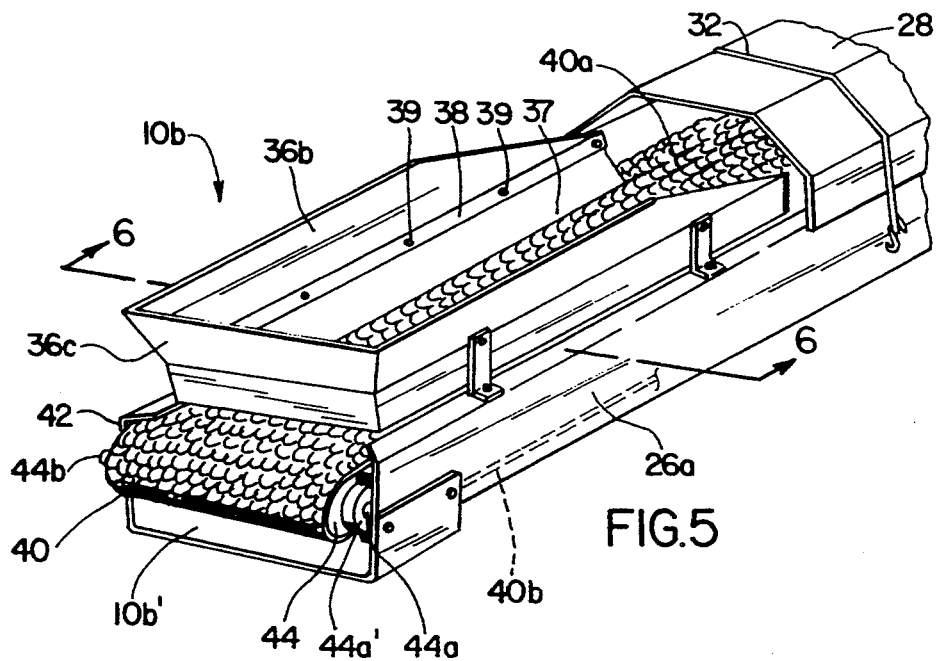

FERTILIZER CONVEYOR

BACKGROUND AND SUMMARY OF THE INVENTION

The present invention relates generally to the field of conveyors, and, more particularly, to a conveyor of the type for agricultural substances, such as fertilizer, which are often transferred from one position to another in bulk quantities, for example, from a mixing device to a hopper wagon. Because such substances frequently inherently contain a great deal of dust and fine particles the new conveyor is enclosed so that loading and unloading of substances therewith is relatively dust-free in comparison with known conveyors. The new conveyor is also provided with unique automatic belt-cleaning structure.

Previously, conveyors or "elevators" for transferring fertilizer or other loose or powdery substances in bulk from one place to another for example, for mixing, storage or transport, have been known and traditionally consisted of a frame-supported continuously driven endless belt in an open-topped, trough-shaped pan. Drawbacks of such known conveyors include: 1.) caking of the substance being transferred (especially in humid conditions) to such an extent that operation of the equipment is impaired and expensive, time-consuming maintenance is required; 2.) waste of material which spills from the conveyor sides; and 3.) production of a great deal of dust which is not only inconvenient in impairing vision and coating all exposed surfaces, but is also physically uncomfortable for workers or others in the immediate vicinity. At times the dust created in such operations is dangerous in its potential for causing illness and sometimes even creating a risk of explosion.

The potential health hazards associated with dust created in such bulk material transfer operations exist to such an extent that regulations are presently in place or are being developed for implementation by various state and federal government agencies, such as the federal Environmental Protection Agency ("EPA"), in order to limit the amount of dust escaping into the air in the vicinity of the operation. Thus, there is a need in the marketplace for a device for bulk transfer of inherently dusty materials, such as are common in the agricultural industry, which device will greatly reduce the amount of airborne dust associated with such operations.

Accordingly, it is among the several objects of the present invention to provide an automated conveyor for agricultural fertilizer and other bulky, dusty substances which conveyor is effectively self-cleaning, waste-reducing, and provided with structure for reducing airborne dust which naturally arises as a result of the process of transferring such substances from one position to another.

It is further among the objects of the present invention that the conveyor having the features mentioned be constructed in a straightforward and sturdy manner to keep maintenance and repair as well as initial construction costs to a minimum, so that the new conveyor can be more readily and economically available to a greater number of potential users and that it be facile and economical to operate while still meeting the requirements of the appropriate government agencies.

Thus, in keeping with the above objects, the present invention is, briefly, a conveyor for transferring loose bulk material, such as fertilizer and the like, in a manner which minimizes the creation of airborne dust. The conveyor includes structure for movably supporting the material to be transferred, a housing for substantially enclosing the structure for movably supporting the material to be transferred, and further structure for automatically cleaning the structure for movably supporting the material to be transferred, and a motor for causing the structure for movably supporting the material to be transferred to move within the housing.

Also in keeping with the invention, briefly, the structure for automatically cleaning includes cleaning members in direct operational contact with the structure for movably supporting material to be transferred and which is automatically driven by operation of the conveyor, to thereby continuously automatically clean the structure for movably supporting material to be transferred as it moves.

Other objects will be in part apparent and in part pointed out hereinbelow.

BRIEF DESCRIPTION OF THE DRAWINGS

FIG. 3 is an enlarged perspective view of the unloading end of the conveyor of FIG. 1, further showing the mounting and adjustment structure of the belt roller and belt cleaner brush.

FIG. 4 is a side elevational view of the conveyor of FIG. 1, partially broken away, illustrating the belt tension adjustment structure.

FIG. 5 is an enlarged perspective view of the rear or loading end of the conveyor of FIG. 1.

Throughout the drawings like parts are indicated by like element numbers.

DESCRIPTION OF THE PREFERRED EMBODIMENT

Figure 1:
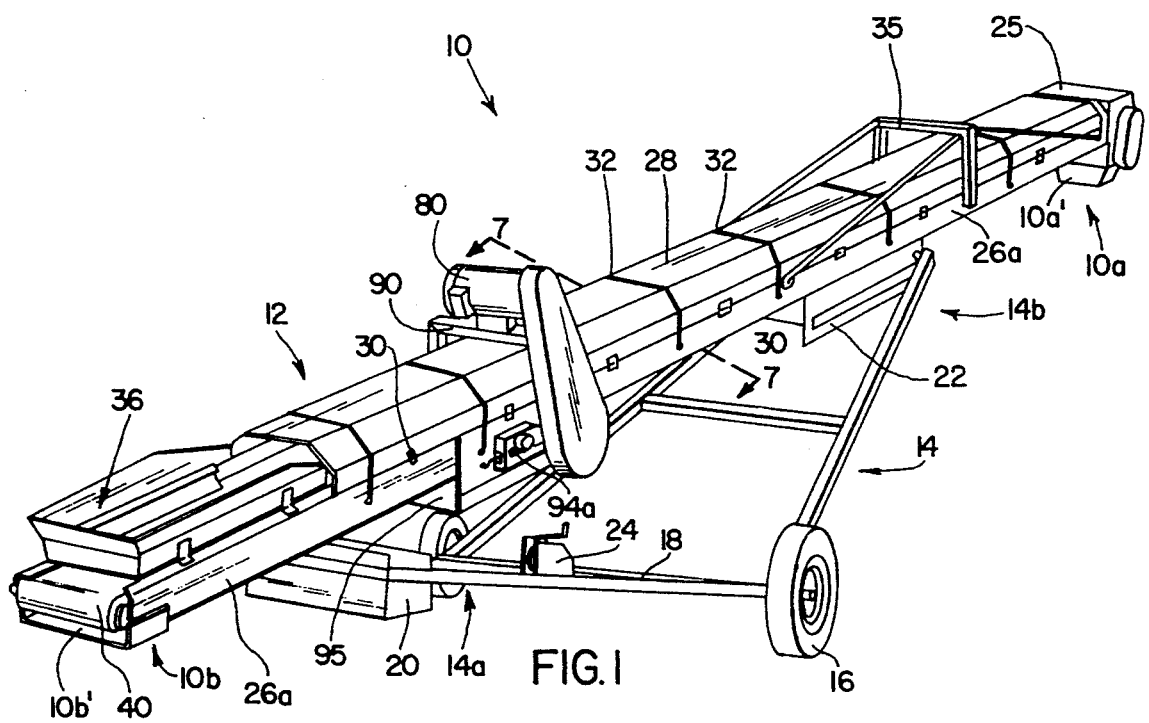
FIG. 1 is a perspective view of an enclosed conveyor constructed in accordance with and embodying the present invention.

With reference to the drawings, 10 generally designates an enclosed conveyor for transfer of bulk quantities of agricultural substances such as fertilizer, grain and the like in a relatively dust-free, reduced waste manner. As seen in FIG. 1, conveyor 10 includes a main body portion, generally designated 12, desirably movably supported, such as for transport by pulling by a truck, on a frame 14 mounted on wheel assemblies 16 in the usual manner.

Frame 14 is generally of known construction, being formed of a plurality of rigid bars fixed together and positioned both longitudinally and transversely substantially beneath main body portion 12 with wheel assemblies 16 rotatably mounted on wheel assembly axle 18 so that conveyor 10 can pivot somewhat forwardly and backwardly thereon as necessary for the particular application.

Upon a rear end 14 a of frame 14a counterbalance 20 is disposed to offset the weight of the forward extending main body portion 12. The front end 14b of frame 14 is adjustably connected, for example, by at least one grooved bracket 22, to permit adjustment of the height of the front or unloading end 10a of conveyor 10 by manipulation of a known winch and cable assembly 24 (cable not shown).

FIG. 1 illustrates that main body portion 12 has a generally elongated, tubular shape formed of a trough-shaped bottom pan 26 which extends continuously from unloading end or "head" 10a, to loading end 10b, and a top cover 28 for movably housing therein an endless conveyor belt which will be discussed in detail later herein. A head cover 25 is removably attached at the forwardmost end of main body portion 12 and is sized and shaped appropriately in order to permit substantial enclosure of all moving parts of head 10a, for safety. (This moving structure will be described further hereafter.) Head cover 25 is removable for cleaning and maintenance of parts thereunder and preferably terminates downwardly at a spout-like bottom end in opening 10a' to permit exit therethrough of material transferred via conveyor 10 to a wagon, truck or other structure.

Figure 9:
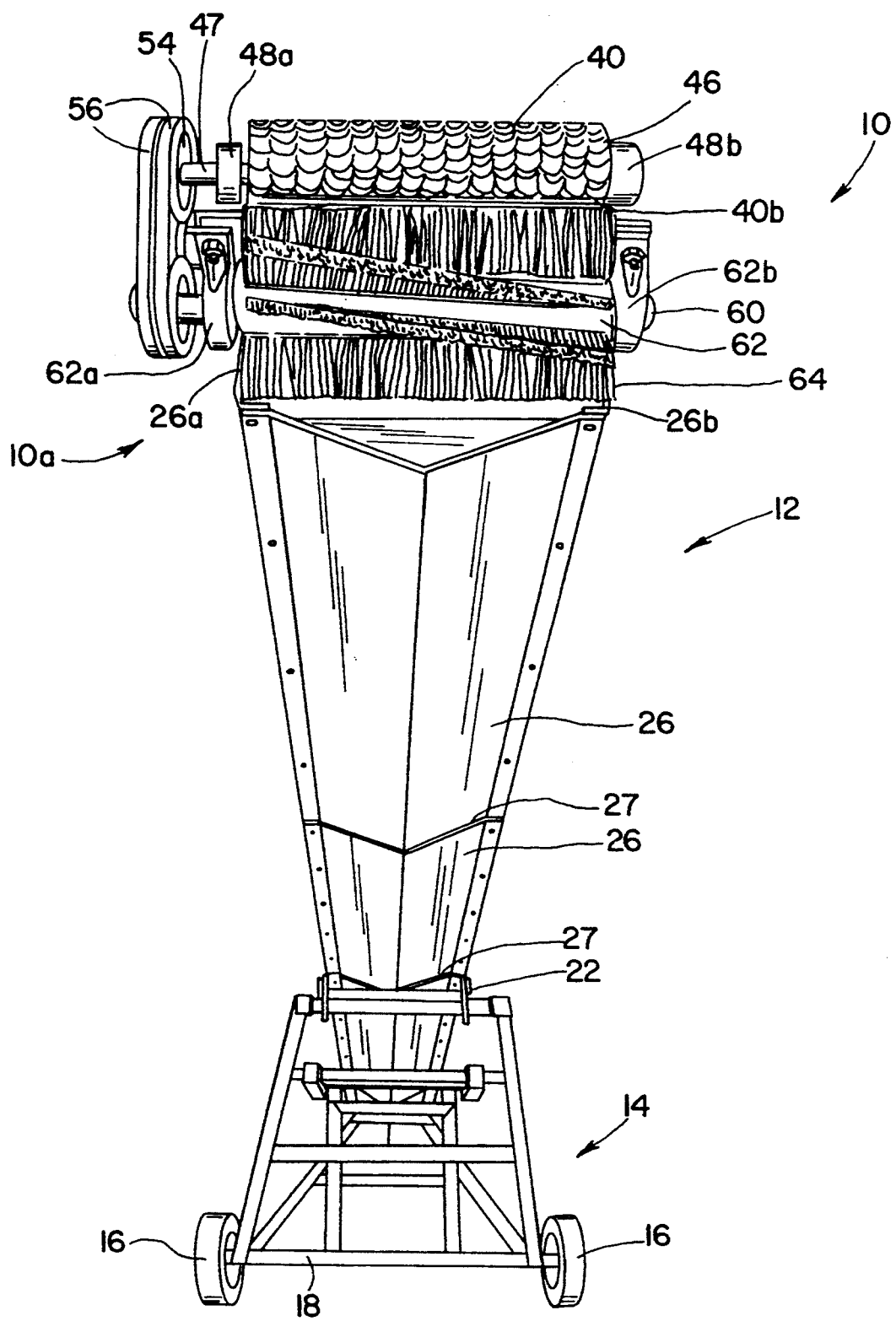
FIG. 9 is a front perspective view of the underside of the conveyor of FIG. 1.

Bottom pan 26 is preferably formed of a series of elongated metal sheets which are longitudinally angled or curved and connected in lengthwise series to form an elongated trough. Desirably, the ends of adjacent sheets of bottom pan 26 overlap one another slightly at seams 27, as shown in FIG. 9, so that dust escaping into bottom pan 26 during operation of conveyor 10 does not filter through the seams and escape into the air, but instead settles and is guided downwardly and rearwardly back to loading end 10b for removal via opening 10b' to a container (not shown) and reloading onto the conveyor belt. In this manner, the conventional loss of product which occurs by spillage over the side rails is avoided completely.

Side rails 26a, 26b extend substantially perpendicularly upwardly from parallel opposed longitudinal edges of bottom pan 26 along most of the length thereof. Side rails 26a, 26b may be formed as integral continuations of bottom pan 26 extending upwardly, preferably by about 8 or 9 inches, or may be formed separately and welded, attached by brads, or otherwise joined thereto.

An elongated top cover 28 extends along substantially the entire length of main body portion 12 and fits snugly over the outer edges of side rails 26a, 26b where it is releasably connected in position, for example by clamps 30 and/or bungee cords 32 or other known connectors. Thus, together, top cover 28 and bottom pan 26 with attached side rails 26a, 26b form a housing through which material to be transferred passes.

Figure 7:
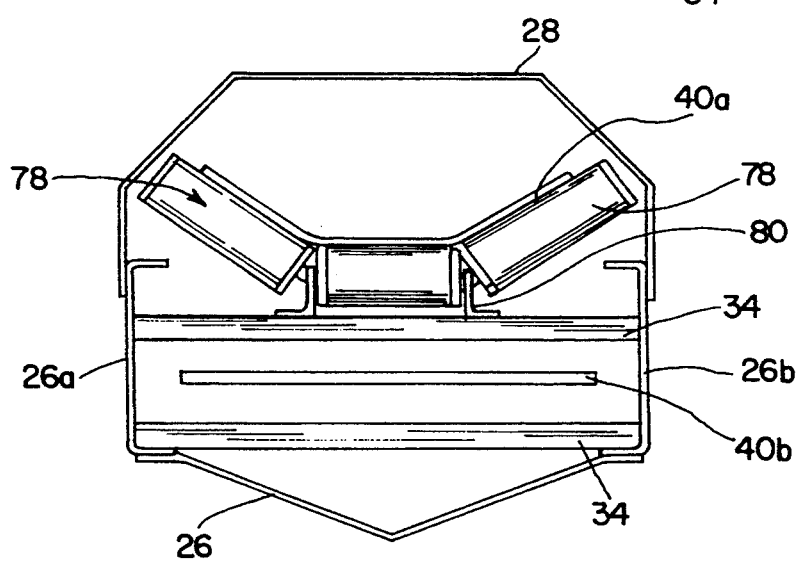
FIG. 7 is a vertical sectional schematic view taken on line 7—7 of FIG. 1.

FIG. 7 illustrates that for increased strength and durability, a number of rigid braces 34 may be disposed transversely within main body portion 12 and are preferably spaced along the length thereof in pairs, one above and parallel to the other, and fixed internally to opposed side rails 26a, 26b. Further structural support is provided to main body portion 12 by the external, upstanding rigid frame and cable assembly 35 seen in FIG. 1.

Figure 6:
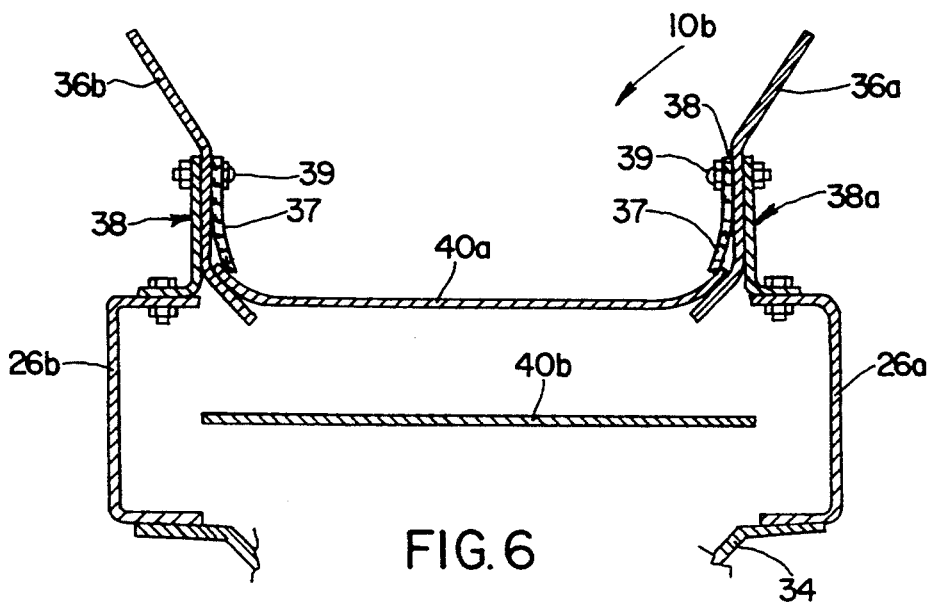
FIG. 6 is a vertical sectional view taken on line 6—6 of FIG. 5, with the bottom pan partially broken away.

With reference to FIGS. 1, 5 and 6, loading end 10b of conveyor 10 is shown to be open at the top, for loading access when in the normally lowered position shown, and thus is not enclosed by top cover 28 which terminates abruptly, adjacent to and forwardly of the forwardmost ends of the upstanding side walls 36a, 36b of a bin 36 into which the dusty bulk material to be moved is loaded, by dumping, shoveling or the like.

Bin side walls 36a, 36b are disposed approximately parallel to each other longitudinally on opposed sides of conveyor 10 and extend upwardly from corresponding side rails 26a, 26b to which they are connected, preferably by bracket and bolt assemblies 38. Loading bin side walls 36a, 36b extend longitudinally rearwardly to intersect opposed ends of an upstanding transverse end wall 36c to which they are attached in order to complete the three-sided bin 36.

Movably mounted longitudinally within enclosed conveyor 10 is an endless conveyor belt 40 having an upper reach 40a for conveying material from the loading bin 36 to unloading end or head 10b and a returning lower reach 40b. Belt 40 is of a known variety, ordinarily formed at least in part of a tough, fiber-reinforced rubber material, much like that of automobile tires, for durability, and preferably is provided over its entire outer surface with "C" or moon-shaped protrusions 42 having the opening of the "C" facing toward unloading end 10b to pushingly enhance upward movement of material on belt 40 from bin 36 toward head 10b.

FIGS. 5 and 6 show that within loading bin 36 the outer surface of belt 40 is preferably sealed by an overlayering flexible strip, lagging, or "lip" 37 of material such as a thick rubber sheeting or rubber coated TEFLON (registered trademark of E. I. DuPont DeNemour and Company). Flexible strip 37 is attached to the internal, lower edges of the bin side and end walls 36a, 36b, 36c by a rigid, narrow, metal attachment strip 38 and connectors such as screws 39 applied spacedly therealong. This arrangement greatly reduces waste and dust by preventing material loaded into bin 36 from filtering between the side edges of belt 40 and the lower edges of the bin walls.

Conveyor belt 40 is movably mounted longitudinally in main body portion 12 on a series of rollers mounted rotatably on conveyor 10. FIG. 5 illustrates that the normally lower end of belt 40 at the interconnection of the lower reach 40b and the upper reach 40a is disposed over roller 44. Belt roller 44 is rotatably mounted to side rails 26a, 26b at loading end 10b in the usual fashion via a roller shaft 44a and bearings 44b into which the opposed ends of shaft 44a are rotatably journaled.

Figure 2:
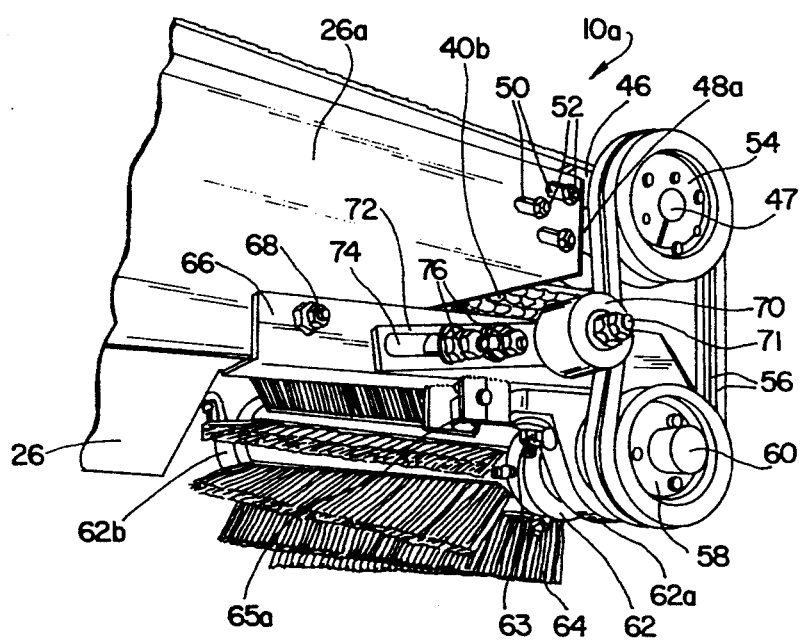
FIG. 2 is an enlarged side perspective view of the unloading end of the conveyor of FIG. 1, with the head cover removed to show the co-driven relationship of the continuous belt and belt cleaner brush.

FIGS. 2, 3 and 9 show that the normally forward extreme of endless belt 40, where upper reach 40a turns over into lower reach 40b, is movably mounted on roller 46 at unloading end 10a of conveyor 10. Roller 46 is disposed transversely in relation to the longitudinal axis of conveyor 10 and is centrally penetrated by a shaft 47 rotatably journaled at its opposed ends in bearings 48a, 48b.

FIG. 2 illustrates that longitudinal slots 50 by which bearings 48a, 48b (not seen in FIG. 2) are adjustably connected by brackets (not seen) to corresponding side rails 26a, , 26b at the forward (unloading end) ends thereof. Longitudinal slots 50 are formed through side rails 26a, 26b and connectors such as nut and bolt assemblies 52 on the bearing mount brackets slideably interconnect therewith.

In this preferred embodiment shaft 47 extends outwardly beyond bearing 48a and terminates in its fixed connection centrally upon sheave 54. Sheave 54 is preferably about five inches in diameter and has mounted thereon paired parallel V-belts 56 which are desirably approximately 30 inches in length.

Figure 11:
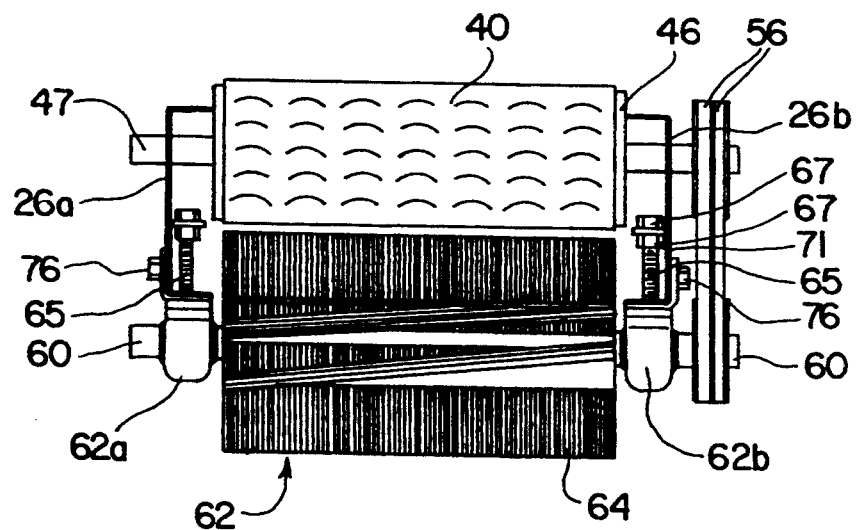
FIG. 11 is a schematic front end elevational view of an alternative construction of the conveyor of FIG. 1.

As shown in FIGS. 2 and 3, belts 56 extend downwardly and are similarly mounted on another sheave 58 which is preferably about 4.4 inches in diameter. Sheave 58 is fixed at its center to one end of a shaft 60 which is similarly disposed transversely relative to the longitudinal axis of conveyor 10, parallel and beneath shaft 47. Shaft 60 extends transversely from sheave 58 and is rotatably journaled in pillow blocks 62a, 62b on opposed sides of conveyor 10, pillow block 62a, being adjacent to sheave 58. Alternatively, belts 56 may be mounted on the opposite side of conveyor 10, as shown in FIG. 11, adjacent to side rail 26b.

Figure 10:
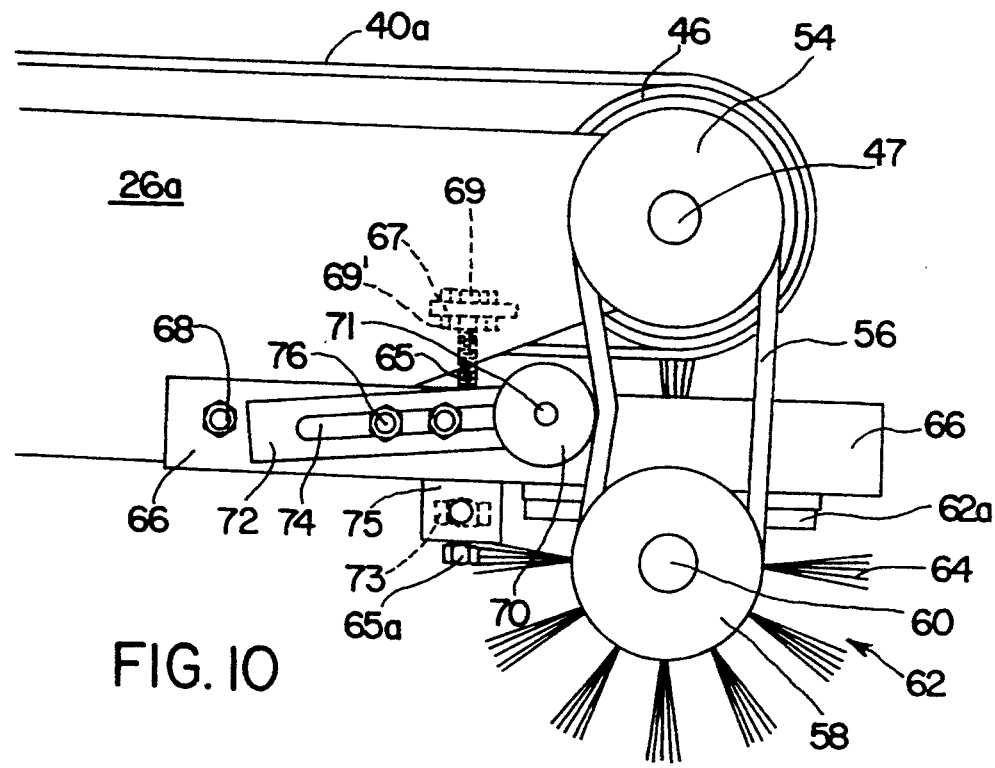
FIG. 10 is a schematic side elevational view of the unloading end of the conveyor of FIG. 1.

Mounting of pillow blocks 62a, 62b is accomplished by connecting them, such as by machine bolt assemblies 63, so as to depend from corresponding elongated L-brackets 66 which are in turn pivotally attached longitudinally to side rails 26a, 26b for example by nut and bolt assemblies 68, as seen in FIGS. 2 and 10 at the rearward ends only of L-brackets 66.

Shaft 60 has fixed thereon a roller broom 62 of known variety with stiff bristles 64 extending outwardly from its columnar exterior surface to such an extent that roller broom 62 has an original overall diameter of approximately 10 inches. Shafts 47 and 60 are selectively spaced apart, in a manner to be described, a sufficient distance so that bristles 64 on roller broom 62 contact and clean endless conveyor belt 40 as it continuously travels from the end of upper reach 40a and begins its return along lower reach 40b.

Rotation of roller broom 62 during this process is effected by the above-described connection of shafts 47, 60 by paired V-belts 56, so that when conveyor 10 is operating with the upper reach of endless belt 40 moving toward unloading end or head 10a, the head pulley shaft 47 will drive rotation of shaft 60 and roller broom 62 mounted thereon in the same direction (clockwise as illustrated in FIG. 2).

Tensioning of paired V-belts 56 for optimal rotational movement of roller broom 62 is accomplished by adjustably placing pressure on the belts via edgewise contact with a roller 70. Pressure adjust roller 70 is centrally rotatably mounted on a pin or shaft 71, so as to extend transversely, outwardly from the forward end of an elongated flat bracket 72. Bracket 72 is in turn adjustably connected to L-bracket 66, preferably by provision of a longitudinal slot 74 for penetration therethrough of bracket 72 by tightenable connectors such as nut and bolt assemblies 76, so that bracket 72 is in parallel side-by-side relationship externally to the normally vertical arm of L-bracket 66. So mounted, by loosening and retightening nut and bolt assemblies 76, roller 70 can be adjusted substantially longitudinally on side rail 26a so as to apply more or less pressure on belts 56, causing roller 46 to be lagged as may be necessary for optimal driving of broom 62.

Although bristles 64 of roller broom 62 are generally quite stiff and tough, with time some wear will occur, the bristles will shorten, and it will be necessary to move roller broom 62 closer to belt 40. In order to permit such adjustment of roller broom 62 toward lower reach 40b of endless conveyor belt 40, and thus movement of broom shaft 60 closer to roller shaft 47, it is desirable that the complete brush mounting structure be substantially vertically adjustable. Accordingly, each connector 68 which attaches an L-shaped bracket or angle iron piece 66 to a corresponding, adjacent side rail 26a, 26b acts as a pivot point for the associated bracket 66. Thus, with roller broom 62 attached as described to brackets 66 it may be moved upwardly and downwardly in spaced relation to endless conveyor belt 40. The described adjustment of broom 62 is accomplished by provision of an adjustment bolt 65 mounted inside of each side rail 26a, 26b approximately perpendicularly relative to the longitudinal axis of the adjacent side rail, opposite slotted bracket 72. Each adjustment bolt 65 is preferably a ⅜" bolt approximately 6" long positioned parallel and adjacent to the inside surface of the corresponding side rail. However, other constructions are conceived which will function similarly and adequately.

Adjustment bolts 65 are each fixed in position at their respective upper ends by a tab 67 which is rotatably penetrated by a bolt 65 upper end and which is rigidly fixed, for example, by welding, to the inside surface of the corresponding side rail 26a, 26b. Above and below each tab 67 on corresponding bolts 65 there are fixed nuts 69, 69', which "sandwich" tab 67 therebetween. Each bolt 65 extends downwardly through the horizontal arm of corresponding L-bracket 66 to the bolt's lower end.

Spacedly upward from their lowermost ends, bolts 65 are each threadably engaged with a nut 73. Nut 73 is seen in phantom in FIG. 10. On opposed sides of each nut 73 are depending flanges 75 which extend downwardly from and are fixed to corresponding L-brackets 66. At the extreme lower end of each bolt 65 is fixed a bolt head 65a for gripping and manipulation of the bolt. Although uppermost nuts 69, 69' are welded to bolt 65 which rotatably penetrates tab 67 (perpendicularly fixed to an adjacent side rail 26a, 26b), lowermost nut 73 is threadably mounted on bolt 65. Thus, by rotation of bolt head 65a nut 73 is moved upwardly or downwardly upon bolt 65 and thereby either forces L-bracket 66 upwardly (as nut 73 encounters the undersurface of the horizontal arm of L-bracket 66) or permits it to shift downwardly along the axis of bolt 65. Accordingly, by such movement of L-bracket 66 roller broom 62 mounted thereon likewise moves upwardly or downwardly. In this manner, roller broom 62 may be adjusted as necessary for brushing engagement with belt 40.

Although the above-described belt cleaning structure is preferred, certainly variations are conceived which may differ, for example, with regard to specific sizes, materials and arrangement of various parts, but which are still within the scope of the invention in which the belt cleaning brush is automatically driven by the belt roller head (or pulley) shaft and is adjustably mounted for optimal automatic belt cleaning operation without the need for a separate motor, additional to that which operates the conveyor, as will be described.

FIG. 7 schematically illustrates one of a series of sets of three rollers, referred to as "tri-rollers" 78 which are provided at spaced intervals, approximately every four and one half to five feet along the length of main body 12, internally thereof. Tri-rollers 78 are rotatably supported by upstanding L-brackets 80 fixed on the upper side of at least some of transverse braces 34 (previously discussed), in such manner that, in each set of tri-rollers, one of the three rollers is disposed approximately centrally, horizontally and transversely within main body 12 and the remaining two rollers extend from their respective positions, one adjacent each end of the centermost roller, at a slight angle upwardly and outwardly therefrom.

So positioned, tri-rollers 78 function as rolling support or "idlers" for upper reach 40a of endless belt 40 as it travels with its load of material toward unloading end 10a. On the return trip, lower reach 40b of endless belt 40 is not so supported, but preferably passes rearwardly between the two transverse braces 34 of each paired set, as seen in FIG. 7.

Figure 8:
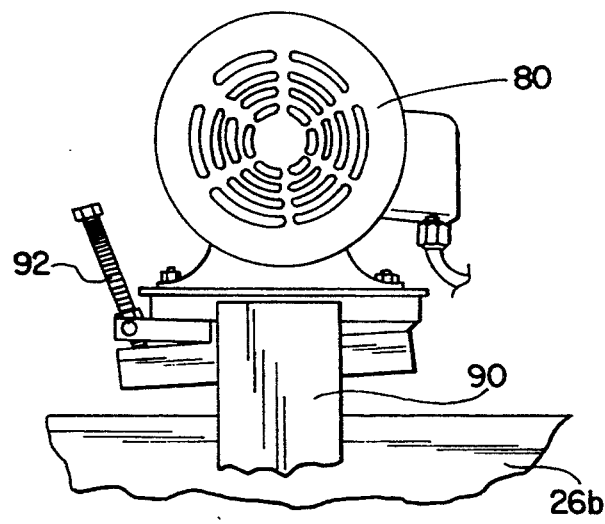
FIG. 8 is a partial side elevational view of the conveyor of FIG. 1, showing the motor and mounting structure therefor.

As illustrated in FIGS. 4 and 8, operation of belt 40 is desirably powered by a variable speed motor 80 which may be of any of a number of known varieties. The shaft 82 of motor 80 is interconnected to drive belt 84, which is in turn connected by a drive pulley 86 to the belt "wrap drive" generally designated 88, to be described further hereafter.

Motor 80 is secured above top cover 28 on a rigid frame 90 at a point spaced longitudinally from loading end 10b and above frame 14, but not so far forwardly that it is inaccessible for service or adversely affects the balance of conveyor 10. The position of motor 80 is made to be somewhat adjustable in a vertical direction via tightening of screw 92 to leverage motor 80 with respect to frame 90, and thereby to place more or less tension on belt 84 as necessary for optimal functioning of conveyor belt 40.

FIG. 4 shows wrap drive assembly 88 by which endless conveyor belt 40 is securely and controllably driven. Wrap drive assembly 88 includes two sets of paired slides 94a, 94b and 96a, 96b. Slides 94a, 96a are each mounted on a rigid, vertical side wall 95a of an openable protective box 95 which is connected underneath and externally to main body portion 12 beneath the position of motor 88.

Side wall 95a of box 95 is fixed longitudinally to side rail 26a and has longitudinal openings formed therein and disposed such that slide 96a is slightly forward and lower than slide 94a. Slides 94b, 96b are fixed in corresponding positions on similar structure on opposed side rail 26b, but are not shown in the figures. So positioned, each slide 96a, 96b serves to slidingly receive a pillow block which journals the end of a shaft positioned transversely relative to the longitudinal axis of conveyor 10.

Thus, paired, opposed bearings 98 in slides 94a, 94b are positioned across the width of conveyor 10 from each other and each rotatably journals one the opposed ends of shaft 100. Likewise, paired bearing 102 in slides 96a, 96b each rotatably journals one of the two opposed ends of shaft 104. Shaft 104 is fixed at its other end to the center of drive pulley 86.

Appropriate tension is supplied to endless belt 40 by longitudinal adjustment of belt shafts 100, 104 by moving bearings 98, 102 longitudinally within corresponding slides 94, 96.

This longitudinal movement is effected by forward or rearward actuation of adjustment screws 106, 108. One adjustment screw 106 is rotatably coupled at one end thereof to each bearing 102 and extends forwardly through and is threadably connected to a vertical wall 96a of a corresponding slide 96. Similarly, one adjustment screw 108 is rotatably coupled at one end thereof to each bearing 98 and extends rearwardly outward through and is threadably connected to a vertical wall 94a of a corresponding slide 94. Thus, conveyor belt lower reach 40b wraps rearwardly over a belt roller mounted on shaft 100, and then under and forwardly until passing over a belt roller mounted on shaft 104 before returning therebeneath rearwardly, toward loading end 10b. With endless conveyor belt 40 so mounted rotation of drive pulley 86 clockwise (as seen in FIG. 4) causes belt 40 to move overall in the same direction, so that upper reach 40a carries material to be transferred forwardly for unloading and lower reach 40b returns empty for passing through wrap drive mechanism 88.

Thus, during normal operation of conveyor 10 lower reach 40b moves toward loading end 10b and upper reach 40a, which ordinarily carries material during operation, moves toward unloading end 10a where most of the material thereon will fall by gravity off the forward extreme of the upper reach of the endless belt, as it turns over roller 46, through opening 10a' to a receptacle below. Most, if not all, of any residual material on belt 40 will be automatically removed therefrom by brushing contact of bristles 64 against the outer surface of the belt and cup-shaped protrusions 42, because brush shaft 60 is automatically caused to turn by rotation of belt roller shaft 47.

It is clear in view of the above disclosure and the figures that the new enclosed conveyor having automatic belt cleaning structure and wrap belt drive is particularly well suited for current needs with regard to control of airborne dust and reduced waste. The new fertilizer conveyor is further particularly useful with regard to the need for such equipment for use in transfer of dusty bulk materials which equipment can be operated in a well controlled, effective manner continuously over long periods by individuals with little training, with little required maintenance.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A conveyor for transferring loose-bulk material, such as fertilizer and the like, in a manner which minimizes the creation of airborne dust, the conveyor comprising:

means for movably supporting the material to be transferred, means for automatically cleaning the means for movably supporting the material to be transferred, means for causing the means for movably supporting the material to be transferred to move, and further comprising a housing substantially enclosing the means for movably supporting the material to be transferred, and wherein the means for movably supporting the material to be transferred is an endless conveyor belt movably mounted within the housing, wherein the housing includes a bottom pan above which the endless conveyor belt moves continuously during operation of the conveyor to thereby reduce waste of material being transferred by catching any material being transferred which escapes from the sides of the endless belt during operation of the conveyor, having a loading end and an unloading end, and further wherein the bottom pan is formed of a plurality of elongated metal sheets disposed longitudinally in end-to-end overlapping relationship, each sheet having a first end and a second end, the first end of each sheet being positioned toward the unloading end of the conveyor and the second end of each sheet being positioned toward the loading end of the conveyor, the first end of any one sheet of the plurality of metal sheets being positioned on the outside of and connected to the second end of the next adjacent sheet which is closer to the unloading end of the conveyor, so as to facilitate rearward, downwardly sliding movement, toward the loading end of the conveyor, of material which has escaped from the endless conveyor belt into the bottom pan during operation of the conveyor, to thereby recover the escaped material.

2. The conveyor of claim 1, wherein the means for automatically cleaning includes cleaning members in contact with the means for movably supporting material to be transferred, and the means for automatically cleaning is connected to the means for movably supporting material to be transferred and is automatically driven by operation thereof, to thereby continuously automatically clean the means for movably supporting material to be transferred as it moves.

3. The conveyor of claim 2, wherein the conveyor has a loading end and an unloading end and further wherein the means for automatically cleaning the means for movably supporting material to be transferred includes a roller broom and the cleaning members are bristles extending from the roller broom, the roller broom being mounted transversely at the unloading end of the conveyor at such a distance that the bristles are in brushing contact with the means for movably supporting the material to be transferred.

4. The conveyor of claim 3, wherein the means for movably supporting material to be transferred is an endless conveyor belt movably supported at the unloading end of the conveyor by a belt roller having a central roller shaft which is rotatably mounted on the conveyor at each of its two opposed ends so as to be parallel to and above the roller broom, the roller broom similarly having a central shaft which is rotatably mounted on the conveyor at each of its two opposed ends, and further wherein one of the ends of the shaft of the belt roller and a corresponding one of the ends of the shaft of the roller broom are interconnected by at least one continuous drive belt in such manner that rotation of the belt roller shaft drives rotation of the roller broom so that as the endless conveyor belt moves the endless belt is automatically brushingly cleaned by the roller broom.

5. The conveyor of claim 4, wherein the roller broom is spacedly adjustable in relation to the belt roller which movably supports the endless conveyor belt at the unloading end of the conveyor, to thereby permit continued use of the roller broom when the bristles thereof have become shortened by wear.

6. The conveyor of claim 4, and further comprising structure for adjusting the at least one continuous drive belt which connects the belt roller at the unloading end of the conveyor to the roller broom, so as to cause the belt roller of the endless conveyor belt to be lagged.

7. The conveyor of claim 1, wherein the housing is generally longitudinal in structure, having opposed loading and unloading ends and extending continuously therebetween, and further wherein the housing is open at the opposed loading and unloading ends thereof to facilitate loading and unloading of the conveyor.

8. The conveyor of claim 7, and further comprising an open-topped, open-bottomed bin having a plurality of upstanding side walls connected to the open loading end of the housing above the endless conveyor belt for facilitating loading of the conveyor with material to be transferred thereby.

9. The conveyor of claim 8, wherein the endless belt has opposed longitudinal edges, and further comprising means for slideably sealing the opposed longitudinal edges of the endless belt against the inside of the bin side walls without impeding movement of the endless belt, to thereby reduce the amount of material being transferred which can escape from the conveyor along the longitudinal edges of the endless conveyor belt during loading of the conveyor.

10. The conveyor of claim 2, wherein the conveyor has opposed first and second ends, and further comprising a first belt roller rotatably mounted transversely at the first end of the conveyor and a second belt roller rotatably mounted transversely at the second end of the conveyor, the first belt roller and the second belt roller movably supporting the endless conveyor belt thereon, the endless conveyor belt having an upper reach for movably supporting the material to be transferred thereon and a lower reach extending substantially parallel to and beneath the upper reach for return of the endless conveyor belt after material to be transported thereon has been transported.

11. The conveyor of claim 2, and further comprising means for causing the tension of the means for movably supporting material to be transferred to be selectively adjustable.

12. The conveyor of claim 11, wherein the means for causing the tension of the endless conveyor belt to be selectively adjustable is a wrap drive tensioning assembly having a plurality of belt rollers each mounted on a roller shaft disposed transversely within the housing, at least one of the roller shafts of the plurality of belt rollers of the wrap drive being rotatably connected at its opposed ends in such manner as to be adjustable along the longitudinal axis of the conveyor, to thereby permit slackening or loosening of the endless conveyor belt as necessary for optimal operation thereof.

13. The conveyor of claim 12, and further wherein the means for causing the endless conveyor belt to move is a motor adjustably operatively connected to the wrap drive tensioning assembly.

14. The conveyor of claim 12, and further wherein the wrap drive tensioning assembly includes means for accessing the tensioning assembly for facile cleaning and maintenance thereof.

15. The conveyor of claim 1, wherein the housing further comprises a top cover which fits snugly over the bottom pan so as to reduce upward escape of dust into the air from the material being transferred on the endless conveyor belt.

16. A conveyor for transferring loose bulk material, such as fertilizer and the like, in a manner which minimizes the creation of airborne dust, the conveyor comprising:
means for movably supporting the material to be transferred,
means for automatically cleaning the means for movably supporting the material to be transferred, means for causing the means for movably supporting the material to be transferred to move, and further comprising a housing substantially enclosing the means for movably supporting the material to be transferred, and wherein the means for movably supporting the material to be transferred is an endless conveyor belt movably mounted within the housing, and further having a loading end and an unloading end and wherein the endless belt has an outer surface and an inner surface, the outer surface having a plurality of integral arc-shaped protrusions formed substantially entirely thereacross and positioned so that the open portion of each arc-shaped protrusion faces toward the unloading end of the conveyor when viewed from above and toward the loading end when viewed from below.

17. The conveyor of claim 16, and further comprising at least one roller broom disposed transversely in relation to the longitudinal axis of the conveyor at the unloading end thereof and in operational contact with the outer surface of the endless belt so that as material being transferred by the conveyor is unloaded therefrom the roller broom causes release of any material being transferred which is residual within any of the plurality of arc-shaped protrusions on the endless belt outer surface.

18. The conveyor of claim 17, and further wherein the respective speeds of the means for movably supporting the material to be transferred and the at least one roller broom are each selectively simultaneously adjustable.

19. A conveyor for transferring loose, bulk material, such as fertilizer and the like, in a manner which minimizes waste of material being transferred and minimizes the creation of airborne dust by the transfer process, the conveyor comprising:

a continuously movable endless belt for supporting the material to be transferred thereon, a housing substantially enclosing the endless belt, a broom connected to the endless belt and in contact therewith in such manner that the endless belt is automatically cleaned by the broom as the endless belt continuously moves, a motor connected to the endless belt for causing the endless belt to continuously move to thereby transfer loose bulk material, and further having a loading end and an unloading end and wherein the endless belt has an outer surface, the outer surface having a plurality of protrusions formed substantially entirely thereacross for facilitating transfer of loose, bulk material on the moveable endless belt.

20. The conveyor of claim 19, wherein the broom is a roller broom having bristles extending outwardly therefrom, the roller broom being mounted transversely relative to the longitudinal axis of the endless belt, and sufficiently close to the endless belt that the bristles brushingly contact the endless belt as it continuously moves.

21. The conveyor of claim 20, wherein the endless belt is movably supported at the unloading end of the conveyor by a belt roller centrally fixed on a roller shaft which is rotatably mounted at each of its two opposed ends so that the belt roller is disposed parallel to and above the roller broom, the roller broom being centrally fixed on a shaft which is rotatably journaled at each of its two opposed ends, and further wherein one of the ends of the shaft of the belt roller and a corresponding one of the ends of the shaft of the roller broom are interconnected by at least one continuous drive belt so that rotation of the belt roller shaft drives rotation of the roller broom to thereby provide automatic continuous cleaning of the endless belt by the roller broom as the endless belt of the conveyor moves during support of material to be transferred by the conveyor.

22. The conveyor of claim 21, wherein the roller broom is selectively spacedly adjustable in relation to the belt roller which movably supports the endless conveyor belt at the unloading end of the conveyor, to thereby permit continued use of the roller broom when the bristles thereof have become shortened by wear.

23. The conveyor of claim 21, and further comprising structure for adjusting the at least one continuous drive belt which connects the belt roller at the unloading end of the conveyor to the roller broom, so as to cause the belt roller of the endless conveyor belt to be lagged.

* * * * *